No. 706,346. Patented Aug. 5, 1902.
O. SCHMIDT.
SHIELD FOR BICYCLE HANDLES.
(Application filed Jan. 7, 1902.)

(No Model.) 2 Sheets—Sheet 1.

WITNESSES.  INVENTOR.
Otto Schmidt
by his Attorney.

THE NORRIS PETERS CO., PHOTO-LITHO., WASHINGTON, D. C.

No. 706,346. Patented Aug. 5, 1902.
O. SCHMIDT.
SHIELD FOR BICYCLE HANDLES.
(Application filed Jan. 7, 1902.)
(No Model.) 2 Sheets—Sheet 2.
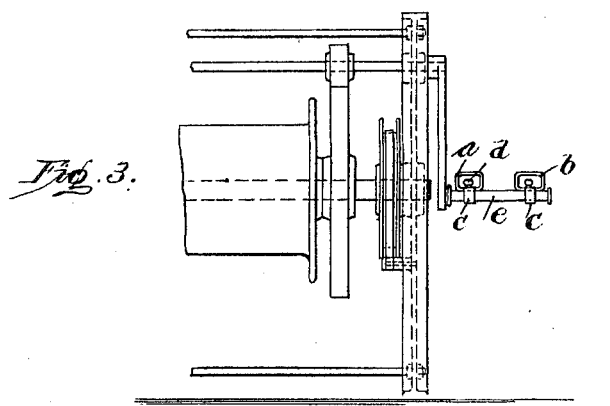
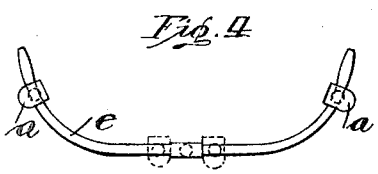
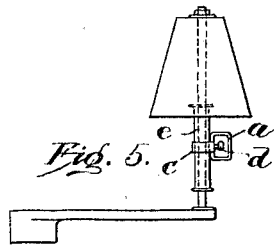
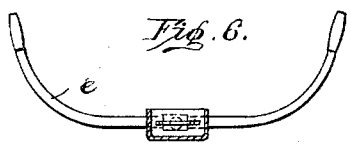
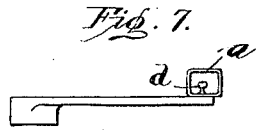
WITNESSES.
INVENTOR.
Otto Schmidt
by his Attorney

UNITED STATES PATENT OFFICE.

OTTO SCHMIDT, OF LEUTENBERG, GERMANY.

SHIELD FOR BICYCLE-HANDLES.

SPECIFICATION forming part of Letters Patent No. 706,346, dated August 5, 1902.

Application filed January 7, 1902. Serial No. 88,796. (No model.)

*To all whom it may concern:*

Be it known that I, OTTO SCHMIDT, a subject of the Emperor of Germany, and a resident of Leutenberg, Thüringen, Germany, have invented certain new and useful Improvements in Shields for Bicycle-Handles, Crank-Shafts, &c., of which the following is a specification.

This invention relates to means for protecting the hands of bicycle-riders and persons engaged in turning crank-shafts or like devices located in the outer air and exposed to the cold.

The object of the invention is to provide a device of this class of neat, strong, and economical construction and quickly and easily adjustable into position or removed therefrom when desired.

With this object in view the invention consists in the improved construction, arrangement, and combination of parts hereinafter fully described and afterward specifically claimed.

Figure 1:
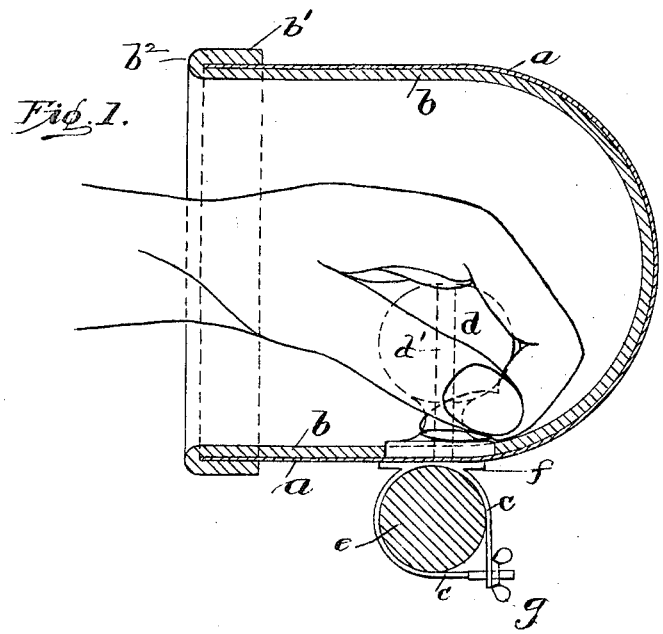
Figure 2:
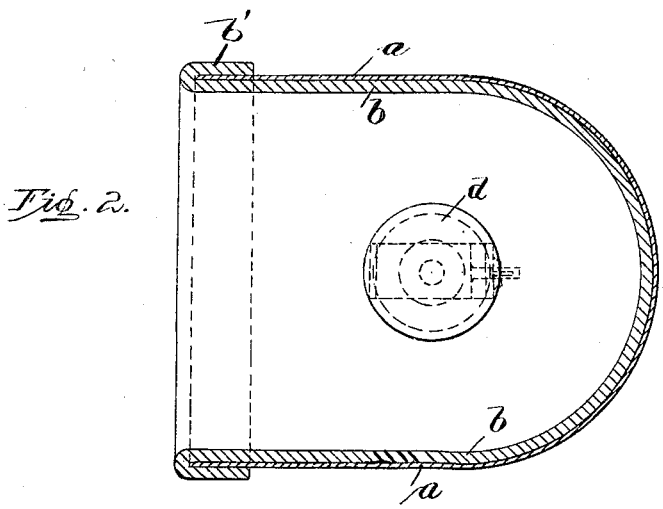

In the accompanying drawings, Figure 1 represents a view in longitudinal vertical section of a device constructed in accordance with my invention and adapted for use on the handle-bars of bicycles. Fig. 2 represents a horizontal sectional view of the same. Fig. 3 represents a view in elevation of parts of an ordinary hoisting-machine, showing my improved shields applied to the crank-handle. Fig. 4 represents a pair of my improved shields applied to bicycle handle-bars, the shields being shown in dotted lines near the center of the handle-bars for use by bicycle racers. Fig. 5 indicates one application of my invention to a vertical crank-handle. Fig. 6 represents a double shield applied to handle-bars of a bicycle, and Fig. 7 represents the application of the invention somewhat similar to that of Fig. 5.

Like letters of reference mark the same parts in all of the figures of the drawings.

Referring to the drawings by letters, $a$ indicates an elongated cup-shaped structure, which I deem a shield proper, and which may be made of sheet metal, hoop-iron, woven-wire fabric, or other suitable material, and which is interiorly lined with felt or other similar fabric, as at $b$, the outer edge of such lining being turned back upon the outside of the framework, as at $b'$, to provide a smooth corner, as at $b^2$, to prevent injury to or rust of cloth from an exposed sharp edge of the latter.

In the lower side of the shield proper is secured a metal block $f$, from which projects outwardly a clamp-ring composed of two arms or strips $c$ $c$, adapted to embrace a bar, as at $e$, which may be either the handle-bar of a bicycle, a crank-handle, or similar device, and to be rigidly secured by means of a thumb-screw or wing-nut $g$, as is clearly shown in Fig. 1. Within the shield is a handle $d$, which is preferably in the form of a knob secured upon the bar $d'$, projecting into the shield proper from the metal block $f$, which, as before described, carries the clamp-ring.

In the use of the invention the knob is gripped by the hand, as illustrated in Fig. 1, whereby the handle-bar may be manipulated as freely as though gripped direct, the hand in the meantime being thoroughly protected from the cold.

In the hoisting-machine illustrated in Fig. 3 two shields $a$ are secured rigidly upon a crank-handle $e$, which, as is common with such devices, is rotatable in the crank-arm, thus permitting the two knobs or handles to be gripped one in each hand of the operator and the hands both protected while operating the crank.

In Fig. 4 I have shown two shields in full lines near the ends of the handle-bars, where the ordinary rider would use them, and in dotted lines near the center of the handle-bars, where a racer would use them.

Fig. 6 shows a single shield to cover both hands at the middle of the handle-bars.

In the construction shown in Fig. 5 the shield is applied to a sleeve slidable and turnable upon an upright crank-handle, and in Fig. 7 the knob itself swiveled in the outer end of the horizontal crank-arm frame, as it were, an upright crank-handle.

The constructions of Figs. 5 and 7 are adaptable for use in manipulating the brakes and switch-arms of motor-cars; but many other applications might be made of the device, the details of construction being subject to variations to some extent without departing from the spirit and scope of the invention.

Having thus fully described my invention, what I claim as new, and desire to secure by Letters Patent of the United States, is—

The herein-described shield for the hands comprising a metallic body of an elongated cup shape having a soft lining falling back upon the outside to form rounded and smooth edges, a metallic block set in one side of the metallic body, a clamp-ring projecting outwardly from said metallic block, means for securing the clamp-ring to the shaft or bar, a pin projecting from the metallic block into the cup-shaped body, attached upon said ring in position to be gripped by the hand and projecting into the metallic body, substantially as described.

In testimony whereof I affix my signature.

OTTO SCHMIDT.

In presence of—
F. STEPHSEN,
A. BRÄUTIGAM.